US006765747B1

United States Patent
Sun et al.

(10) Patent No.: US 6,765,747 B1
(45) Date of Patent: Jul. 20, 2004

(54) METHOD AND APPARATUS FOR REDUCING LOW FREQUENCY REPEATABLE RUNOUT IN HARD DISK DRIVE

(75) Inventors: Yu Sun, Fremont, CA (US); Don Brunnett, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 298 days.

(21) Appl. No.: 10/010,557

(22) Filed: Nov. 7, 2001

Related U.S. Application Data

(60) Provisional application No. 60/246,382, filed on Nov. 7, 2000.

(51) Int. Cl.[7] .............................................. G11B 5/596
(52) U.S. Cl. .................................................. 360/77.04
(58) Field of Search ........................... 360/77.04, 77.02

(56) References Cited

U.S. PATENT DOCUMENTS 5,859,742 A  *  1/1999  Takaishi .................. 360/78.01

* cited by examiner

Primary Examiner—David Hudspeth
Assistant Examiner—Mitchell Slavitt
(74) Attorney, Agent, or Firm—Tejpal S. Hansra

(57) ABSTRACT

A method and apparatus are disclosed which allow for compensation of repeatable runout in a disk drive when an actuator arm assembly has a relatively high friction to inertia ratio in a pivot bearing assembly. The compensation uses one of two initial runout coefficients, based on a seek length. If the seek length is shorter than a predetermined distance, a current runout coefficient is used to compensate for repeatable runout which is continuously updated throughout a previous seek operation. If the seek length is greater than the predetermined distance, a transient runout coefficient is used to compensate for repeatable runout which is updated following the initial revolutions of the hard disk.

41 Claims, 5 Drawing Sheets

METHOD AND APPARATUS FOR REDUCING LOW FREQUENCY REPEATABLE RUNOUT IN HARD DISK DRIVE

Priority is claimed from U.S. Provisional Patent Application No. 60/246,382, filed Nov. 7, 2000 entitled "A Mixed Compensation Scheme To Deal With Low Frequency Repeatable Runout In Hard Disk Drive," which is incorporated by reference in its entirety.

FIELD OF THE INVENTION

The invention relates in general to transducer positioning in a magnetic data storage system and, more particularly, to compensation for low-frequency repeatable run-out (RRO) created by relatively high actuator arm bearing pivot friction in a magnetic disk drive.

BACKGROUND OF THE INVENTION

A simplified diagrammatic representation of a disk drive, generally designated 10, is illustrated in FIG. 1. The disk drive 10 comprises a disk stack 12 (illustrated as a single disk in FIG. 1) that is rotated by a spindle motor 14. The spindle motor 14 is mounted to a base plate 16. An actuator arm assembly 18 is also mounted to the base plate 16.

The actuator arm assembly 18 includes a transducer 20 (or head) mounted to a flexure arm 22 which is attached to an actuator arm 24 that can rotate about a pivot bearing assembly 26. The actuator arm assembly 18 also includes a voice coil motor 28 which moves the head 20 relative to the disk 12. The spin motor 14, and actuator arm assembly 18 are coupled to a number of electronic circuits 30 mounted to a printed circuit board 32. The electronic circuits 30 typically include a digital signal processor (DSP), a microprocessor-based controller and a random access memory (RAM) device.

Referring now to the illustration of FIG. 2, the disk stack 12 typically includes a plurality of disks 34 each having a pair of disk surfaces 36, 36. The disks 34 are mounted on a cylindrical shaft 37 and are designed to rotate about axis 38 of the shaft 37. The shaft 36 has clamps 40 which are used to secure each disk 34 to the shaft 37. The spindle motor 14 as mentioned above, rotates the disk stack 12.

Referring now to the illustration of FIG. 3, the actuator arm assembly 18 includes a plurality of transducers 20, each of which correspond to a disk surface 36. Each transducer 20 is mounted to a corresponding flexure arm 22 which is attached to a corresponding portion of the actuator arm 24 that can rotate about the pivot bearing assembly 26. The VCM 28 operates to move the actuator arm 24, and thus moves the transducers 20 relative to their respective disk surfaces 36.

Although the disk stack 12 is illustrated having a plurality of disks 34, it may also contain a single disk 34, with the actuator arm assembly 18 having a corresponding single actuator arm 24. A recent trend of many disk drive manufacturers is to move toward a single disk, single head, low cost design. This helps to reduce costs associated with the disk drive, as fewer components are required. Additionally, as is typical with many high volume manufacturing process, costs can be further reduced by using common components for a number of different products. Thus, it would be advantageous to have common components for both hard disk drives having multiple hard disks, and hard disk drives having a single disk. By having common components, the volume of the components required is increased, which typically results in a lower unit cost for each component.

Data is read from or written to a track on the disk surface using the transducer 20 that is held close to the track while the disk 34 spins about its center at a substantially constant angular velocity. The transducer 20, located at the end of the actuator arm 24, is positioned in close proximity to the track using the VCM 28. When a disk drive 10 initially receives a request to read or write data to a specific track, the disk drive determines the current location of the transducer 20 (i.e. the starting track) and the location of the track where data is to be read or written (i.e. the destination track). The distance from the starting track to the destination track is commonly known as the seek length.

The electronic circuits 30 within the disk drive 10 determine a seek velocity profile which is used to supply current to the VCM 28 in order to move the actuator arm 24, and thus the transducer 20 from the starting track to the destination track. Once the transducer 20 has reached the destination track, the disk drive 10 enters a settle state, where the position of the transducer 20 is settled close to the center of the destination track. When the transducer 20 has settled, the disk drive 10 enters a track following operation.

To properly locate the transducer 20 near the target track during a read or write operation, a closed-loop servo scheme is generally implemented that uses feedback from servo data read from the disk surface 36 to align the transducer 20 with the target track. The servo data is commonly written to the disk surface 36 using a servo track writer (STW), but may also be provided in other ways, such as through pre-printed media. The servo data is commonly written as radially aligned servo sectors, or servo wedges, which extend between the inner diameter and outer diameter on each disk surface 36.

In an ideal disk drive system, the tracks of the data storage disk are non-perturbed circles situated about the center of the disk. As such, each of these ideal tracks includes a track centerline that is located at a known constant radius from the disk center. In an actual system, however, non-perturbed circular tracks on the data storage disk are rare. That is, problems, such as inaccuracies in the STW and disk clamp slippage, can result in tracks that are not ideal non-perturbed circular tracks. Positioning errors created by the perturbed nature of these tracks are known as written-in repeatable run-out (RRO). The perturbed shape of these tracks complicate the transducer positioning function during read and write operations because the servo system needs to continuously reposition the transducer during track following to keep up with the constantly changing radius of the track centerline with respect to the center of the spinning disk.

A number of methods are currently used to compensate for RRO, with a common method being a feedforward circuit. The RRO is measured by using a single-point discrete Fourier transform (DFT) to generate a runout coefficient which is stored in the memory of the digital signal processor (DSP). When compensating for the RRO, the runout coefficient is retrieved from the DSP memory. The runout coefficient is stored in the DSP memory in an index-synchronized sine and cosine value for the particular track and sector. The runout coefficient is adjusted with the gain and phase change by the controller, adjusted by the cylinder skew, and added back to the control output. The control output is used to actuate the VCM to reposition the transducer with respect to the disk surface and help keep the transducer centered over the data track.

The feedforward circuit generally uses one of two schemes to generate the runout coefficient. The first scheme calibrates the RRO at the power up and adaptively modifies it at the first one or two revolutions after the seek according to the following equations:

$$\text{Runout\_Sin\_Coef}_k = \quad [1]$$
$$\text{Runout\_Sin\_Coef}_{k-1} + g*2/N*\sum_{k=0}^{N-1} perr(k)*\sin(2\pi*k/N)$$

$$\text{Runout\_Cos\_Coef}_k = \quad [2]$$
$$\text{Runout\_Cos\_Coef}_{k-1} + g*2/N*\sum_{k=0}^{N-1} perr(k)*\cos(2\pi*k/N).$$

In the above equations, N is the number of servo wedges in one revolution, and g is the adaptation gain. In an ideal case, g is equal to one, which implies a one revolution cancellation of runout, however, since accurate cancellation requires precise knowledge of the servo system transfer function (gain and phase), g is generally less than one to ensure stability of the servo loop due to variation of the system. The position error signal, perr, is generated from the servo information located on the disk surface. The magnitude of perr corresponds to the distance between the transducer and the track centerline. The runout coefficient is stored in the memory of the DSP in an index-synchronized table, which corresponds to the track and sector for that runout coefficient. Following the first one or two revolutions of the hard disk, the runout coefficient is stored. The runout coefficient is retrieved when needed to compensate the RRO when the transducer is located at that track and sector on the disk surface.

A second common scheme to determine the runout coefficient is to continuously adapt the runout coefficients after the actuator arm settles on track. That is, the runout coefficient is stored at the end of the seek operation, rather than after just the first one or two revolutions of the hard disk. The latest runout coefficient is stored in the memory of the DSP in the same index-synchronized table as described above. The runout coefficient is retrieved when needed to compensate the RRO when the transducer is located at that track and sector on the disk surface.

As mentioned above, an important factor in disk drive design and manufacturing is cost, which can be reduced through single disk hard disk drives which use common components with other, multiple head disk drives. One such component which would be beneficial to use as a common component between different disk drives is the pivot bearing assembly. That is, it would be beneficial to use a pivot bearing assembly in several types of disk drives, including a single disk type configuration. This can help reduce costs in such a system due to both the high volume of common pivot bearing assemblies used in the different types of disk drives, as well as reducing or eliminating the need to design a separate pivot bearing assembly for such a disk drive.

However, having a common pivot bearing assembly for a single disk hard disk drive results in further complicating transducer positioning in such a drive. This is because the relative amount of friction in the pivot bearing assembly for a single disk hard disk drive is increased as compared to the friction of the same pivot bearing assembly in a multiple disk hard disk drive. In many disk drives, the pivot bearing friction in the actuator arm is relatively low with respect to the inertia in the actuator arm. As such, the friction effect on the movement of the actuator arm is repeatable for all operations of the disk drive. However, in a single disk, single head, low cost design, the friction effects of the bearing pivot become more significant. With a single disk configuration, the actuator arm assembly has only one actuator arm, and one transducer for the single disk. As a result, the bearing pivot friction compared to the actuator arm assembly inertia may have a much higher ratio than the ratio present in a disk drive having a plurality of hard disks, and thus a plurality of actuator arms and tranducers.

The movement of the actuator arm assembly in such a system may be even further complicated because the movement of the actuator arm can vary depending upon the seek length. For relatively short seek lengths, the bearing members (i.e. balls) within the pivot bearing may not be rotating smoothly, resulting in additional compensation to move the actuator arm assembly in such a situation. For relatively long seek lengths, the bearing members within the pivot bearing are likely to be rotating relatively smoothly, thus less compensation is required. The gain for the actuator arm assembly, known as mechanical plant gain, can thus vary depending upon the seek length.

Referring now to FIG. 4, a bode plot comparison of mechanical plant frequency response between an actuator arm assembly with low pivot bearing friction 50 (i.e. multiple disk hard disk drive) and an actuator arm assembly with high bearing friction 54 (i.e. single disk hard disk drive) on a 5400 RPM hard disk drive, is illustrated. As will be understood, a 5400 RPM hard disk drive, a common rotation speed in present day hard disk drives, rotates at 90 Hz, known as a 1 f frequency. As can be seen from the figure, the actuator arm assembly with the low pivot bearing friction 50 has a mechanical plant which resembles a rigid body down to a frequency of approximately 55 Hz. As can also be seen from the figure, the actuator arm assembly with a high pivot bearing friction 54 has a plant which resembles a rigid body only down to a frequency of approximately 200 Hz. Because the 1 f frequency in this example is 90 Hz, the corner frequency of an actuator arm assembly with a high friction pivot bearing is above the 1 f frequency. Accordingly, the plant does not resemble a rigid body down to the 1 f frequency for this actuator arm assembly, and additional feedback is required in order to properly move the actuator arm assembly into a correct position with respect to the disk surface.

Furthermore, as mentioned above, the mechanical plant gain may also be dependent upon the seek length. Referring to the graph of FIG. 5, the gain variation with respect to time, following a long seek, of an actuator arm assembly having a relatively high friction to inertia ratio is illustrated. The graph of FIG. 5 illustrates, on the y-axis, the number of DSP counts from the DSP for the servo with respect to the number of revolutions since the transducer has started settling on-track. In this case, a DSP count of 300 represents the system gain at a steady state. As can be noted from the graph, the actuator arm assembly has a high gain jump, more than a 10% gain variation, immediately after a long seek. In such a system, following a long seek, there will be a large transient RRO during the course of settling. This large transient RRO is not desirable, as it may contribute to both write-to-write track misregistration (TMR), because track squeeze may occur depending upon the history of seek operations. The large transient RRO may also contribute to write-to-read TMR as read and write operations occur following different types of seeks, such as between a long seek and a short seek.

As noted above, there are two common schemes used to generate a runout coefficient for use in a feedforward circuit. The first scheme is suitable when the frequency response of the plant resembles a rigid body up to the compensated frequency. However, if the plant does not resemble a rigid body up to the compensated frequency, such as the case with an actuator arm assembly with a relatively high pivot bearing friction, the gain variation may result in a large RRO. The second scheme is effective in following slow gain variation, which may be present with an actuator arm assembly having a high pivot bearing friction. However, the second scheme can result in a large transient RRO as described above with respect to FIG. 5, when there is a high gain jump following a long seek. Accordingly, it would be advantageous to have a compensation scheme for compensating RRO in a disk drive which can compensate for both the gain variation present when the plant does not resemble a rigid body up to the compensated frequency, as well as compensating for high transient mechanical plant gain after a long seek.

Accordingly, it would be advantageous to have a servo compensation scheme for positioning an actuator arm assembly in a hard disk drive which can (1) compensate for relatively high bearing pivot friction, (2) can compensate for gain variation present following different seek lengths, and (3) can allow the use of a similar pivot bearing assembly in both single and multiple disk hard disk drives.

SUMMARY OF THE INVENTION

The present invention solves the aforementioned problems and meets the aforementioned, and other, needs. A method and apparatus for reducign low frequency repeatable runout in a hard disk drive is provided. In one embodiment, the invention provides a mixed compensation scheme which employs different adaptation and application methods for determining a runout coefficient depending on the type of seek. Different runout coefficients are stored in the hard disk drive for use in calculating runout compensation. A transient runout coefficient is used to store runout coefficients adapted during the initial revolutions of the hard disk following a long seek. A current runout coefficient is used to store the continuously adapted runout coefficient for use during short seeks.

At the start of a seek, the disk drive determines if the seek is a long seek or a short seek. If the seek is a long seek, the disk drive uses the transient runout coefficient in the runout compensation in order to compensate for the large gain variation present following a long seek. During a long seek, the runout coefficient is stored into the transient runout coefficient following the initial revolutions of the hard disk. If the seek is a short seek, the disk drive uses the current runout coefficient in the runout compensation. After the transducer settles on the destination track, the runout adaptation starts to operate and the current runout coefficient continues to be updated throughout the seek. The runout coefficient is saved at the end of the seek as the current runout coefficient.

Additional features and other embodiments of the present invention will become apparent from the following discussion, particularly when taken together with the accompanying drawings.

DETAILED DESCRIPTION

Figure 1:
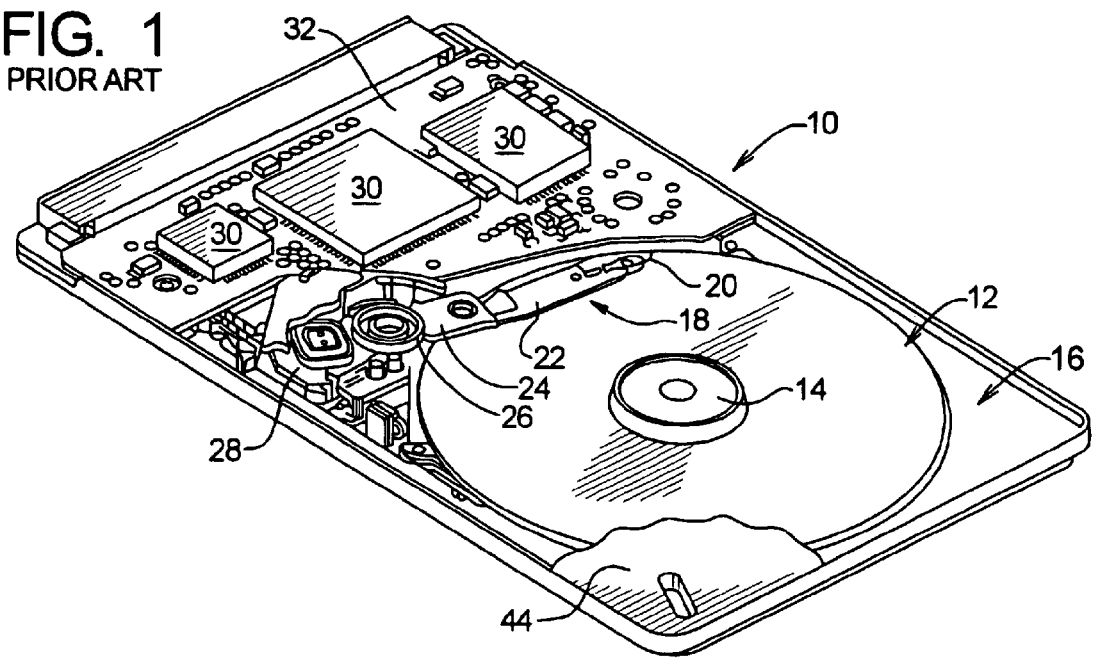
FIG. 1 is a simplified diagrammatic representation illustrating a disk drive.
Figure 2:
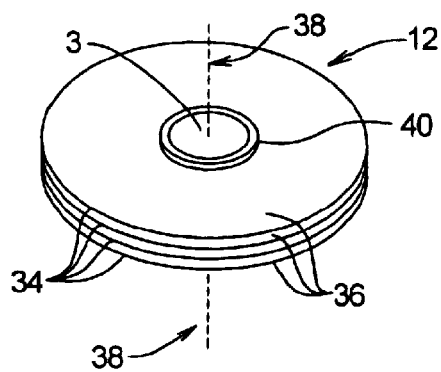
FIG. 2 is a diagrammatic representation of a disk stack having a plurality of hard disks.
Figure 3:
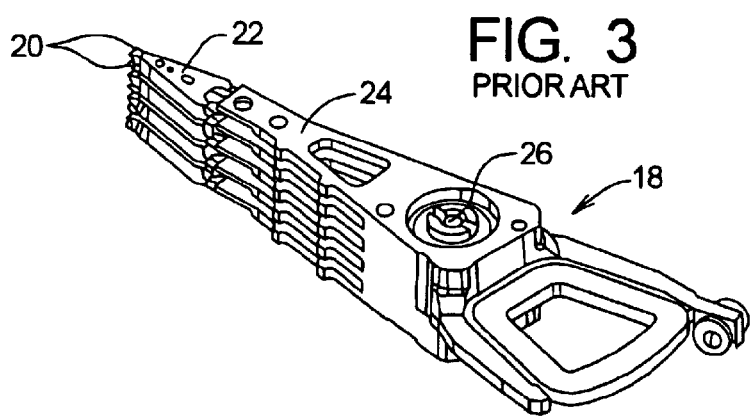
FIG. 3 is a diagrammatic representation of a portion of an actuator arm assembly having a plurality of actuator arms.
Figure 4:
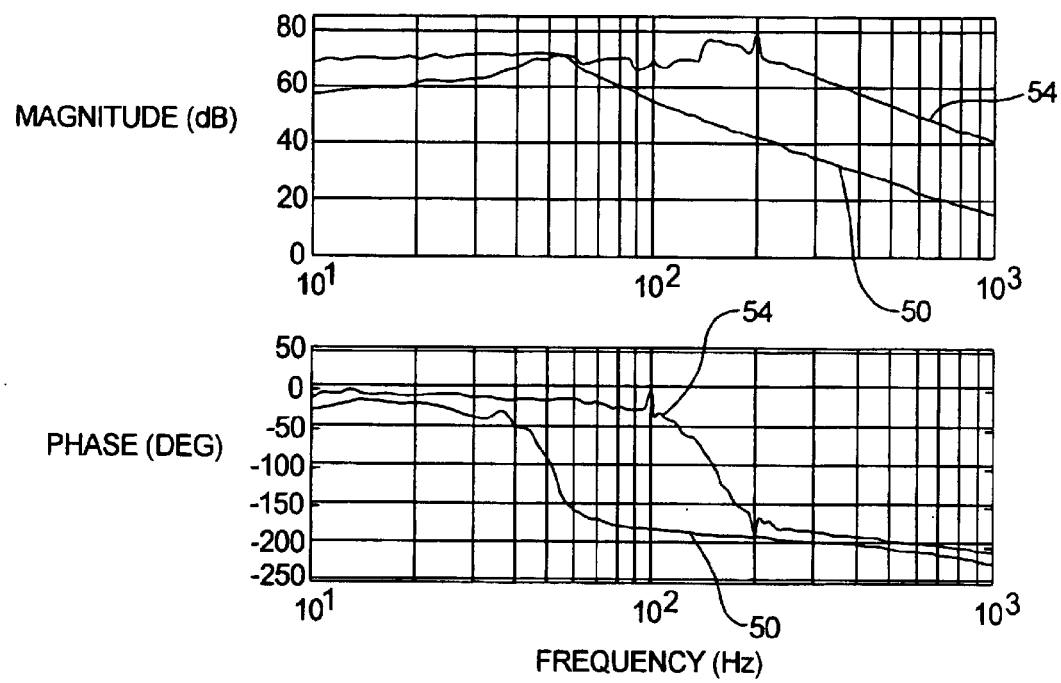
FIG. 4 is a bode plot illustrating the mechanical plant response of an actuator arm assembly having a high pivot bearing friction and an actuator arm having a low pivot bearing friction for an exemplary disk drive.
Figure 5:
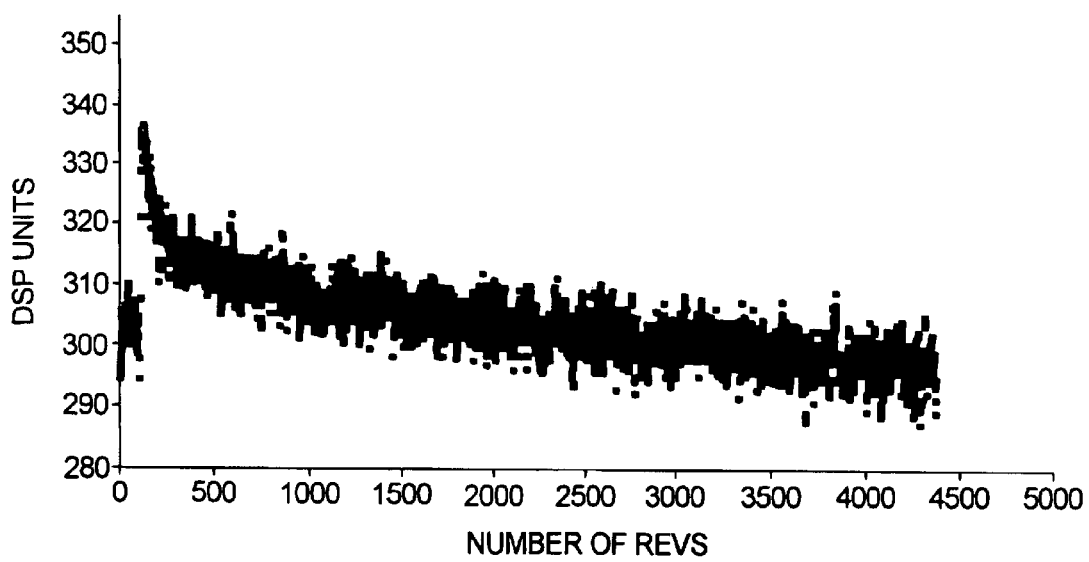
FIG. 5 is a graph illustrating the time variation of gain of an actuator arm assembly with high pivot bearing friction for an exemplary disk drive.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Figure 6:
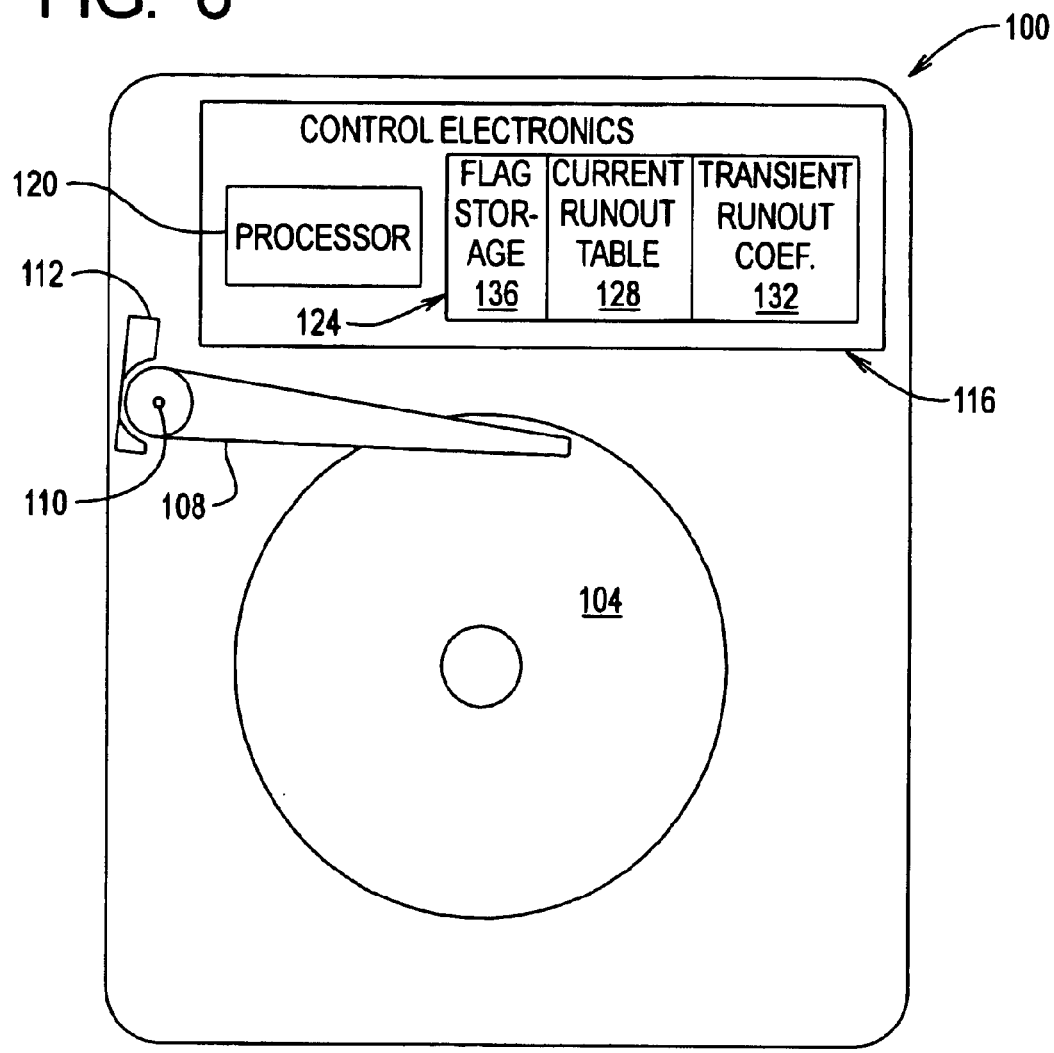
FIG. 6 is a block diagram illustrating a disk drive of one embodiment of the present invention.

The inventors have recognized that each of the runout compensation schemes described above have advantages and disadvantages, and that combining these schemes results in an effective technique for compensating low frequency RRO in a disk drive with relatively high pivot bearing friction. Referring to FIG. 6, a block diagram illustration of a disk drive of one embodiment of the present invention is now described. The disk drive 100, has a single magnetic storage disk 104, an actuator arm assembly 108 which includes a VCM 112. The actuator arm assembly 108 rotates about a pivot bearing 110. In one embodiment, the pivot bearing 110 has a relatively high friction to inertia ratio, resulting in a mechanical plant gain which has a corner frequency above the 1 f frequency of the disk drive 100. The VCM 112, and the movement of the actuator arm assembly 108, are controlled by control electronics 116 within the disk drive 100. Within the control electronics 116 is a processing portion 120, and a memory portion 124. It will be understood that the processing portion and memory portion may be integrated in a single electronic component, and also that the processing portion and memory portions may be present in several electronic components which combine to provide the necessary functions to the disk drive. Within the memory portion 124, there is a current runout table 128, a transient runout coefficient storage area 132, and a flag storage area 136.

Figure 7:
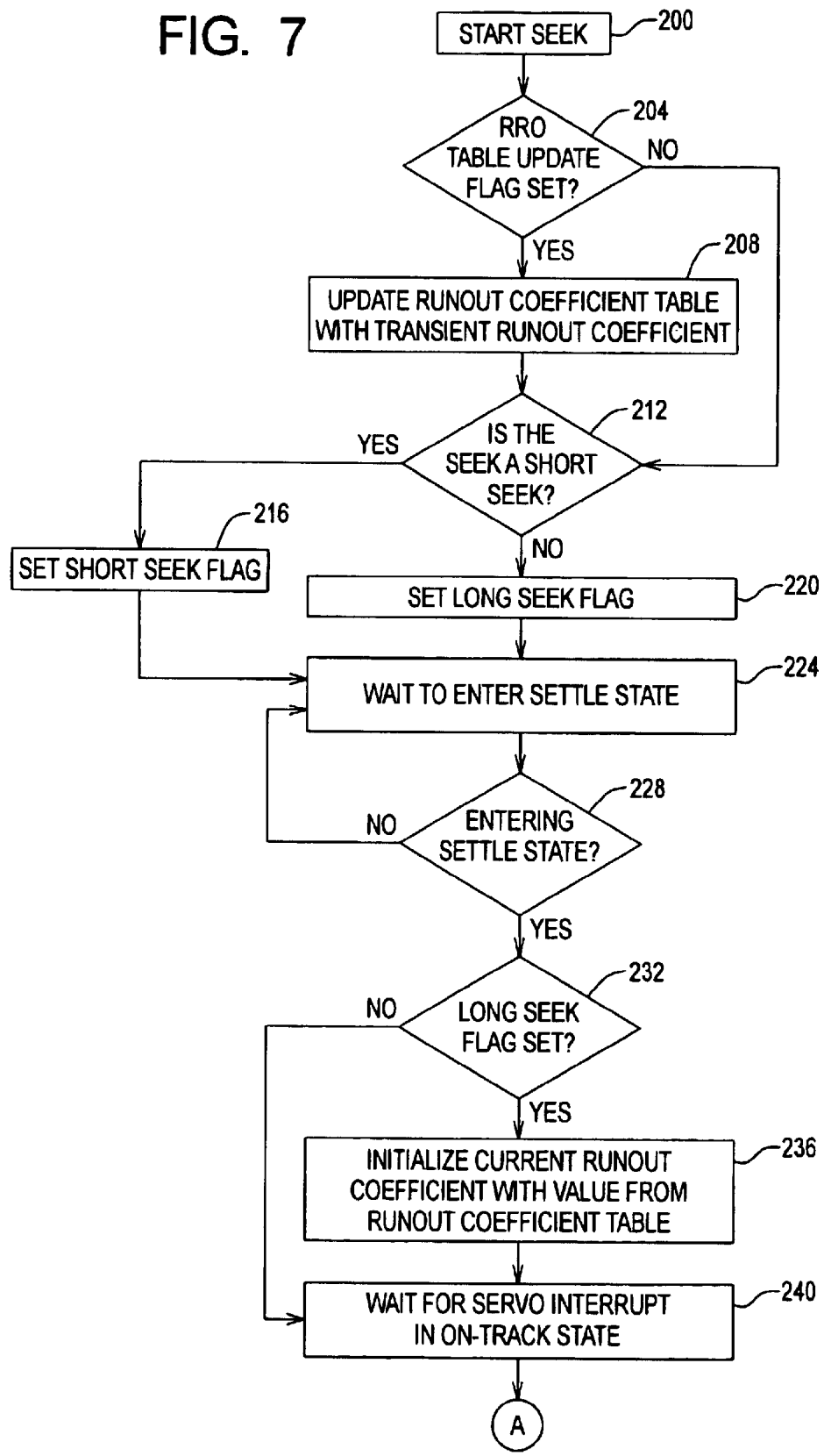
FIG. 7 is a flow chart illustration of the operation for starting and settling during a seek for one embodiment of the present invention.
Figure 8:
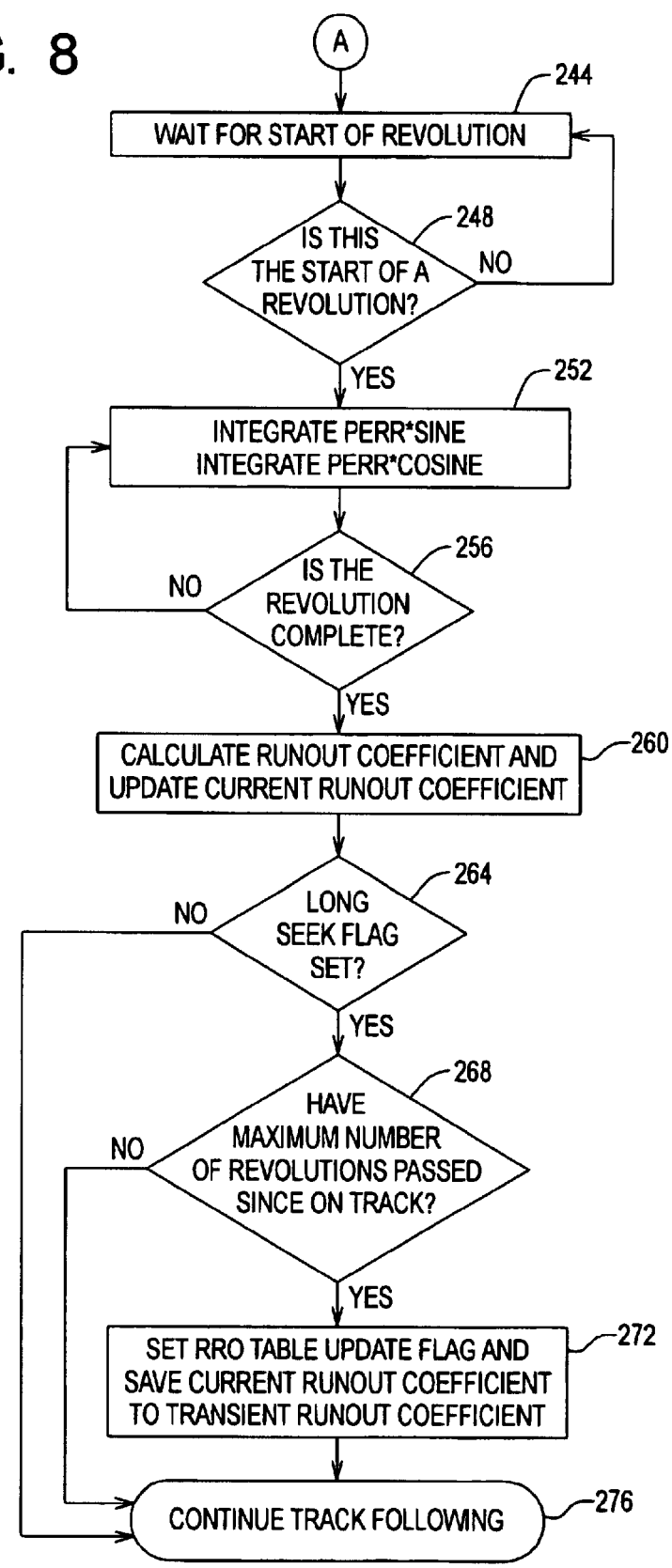
FIG. 8 is a flow chart illustration of the operation for track following during a seek for one embodiment of the present invention.

Referring now to FIGS. 6–8, the operations for performing a seek for one embodiment of the present invention is now described. Initially, according to the flow chart illustration of FIG. 7, and as noted by block 200, the disk drive 100 starts a seek operation. The seek operation starts when the disk drive 100 receives an instruction from a host (not shown) to read data from, or write data to, a specified track (or tracks) on the hard disk 104. At block 204, the disk drive 100 determines if an RRO table update flag is set within the flag storage area 136. The RRO table update flag, as will be described in more detail below, is set during the track following portion of a previous seek operation. If the RRO table update flag is set, the disk drive 100 updates the runout coefficient table 132 with the value stored in the transient runout coefficient storage area 132, according to block 208. The value stored in the transient runout coefficient storage area 132 is stored in a previous seek operation, the storage of which will be described in more detail below.

At block 212, the disk drive 100 determines if the seek is a short seek. This determination is made by the processing portion 120, by determining the seek length of the current seek operation. The selection of a cutoff seek length between a short seek and a long seek is dependent upon the mechanical properties of the pivot bearing assembly, such as ball bearing movement, grease properties, and preload configuration. The short seek length, in one embodiment, is chosen such that the gain variation over time is less than 10% for seek lengths at or below the short seek length. In one embodiment, the processing portion 120 determines that a seek is a short seek when the seek length is less than about one-third of the maximum seek length.

In another embodiment, the processing portion 120 employs an adaptive scheme for determining if a seek is a short seek. In this embodiment, the processing portion monitors the gain variation for the initial revolutions of the hard disk 104 when it enters track following mode. If the gain during the initial revolutions is within 10% of the gain during later revolutions, a seek of that length is considered to be a short seek. If the gain changes more than 10% between the initial and later revolutions of the hard disk 104, a seek of that length is considered to be a long seek. In one embodiment, a default seek length is set as a cutoff between a short seek and a long seek. If the processing portion 120 detects a gain variation of more than 10% between initial hard disk revolutions and later hard disk revolutions, and the seek length was determined to be a short seek, the processing portion changes the cutoff to be the seek length of the seek that had high gain variation. Likewise, if the seek was determined to be a short seek, and had high gain variation during the initial revolutions of the hard disk, the processing portion would adjust the cutoff between a long and short seek.

If the processing portion 120 determines that the seek is a short seek, it sets a short seek flag within the flag storage area 136 and clears any long seek flags which may be set, as noted by block 216. If the seek is not a short seek, processing portion 120 sets a long seek flag within the flag storage area 136 and clears any short seek flags which may be set, as noted by block 220.

The processing portion 120 then waits for the actuator arm assembly 108 to enter a settle state, where the actuator arm assembly 108 is positioning the transducer in proximity to the track which is to be read or written, as noted by block 224. At block 228, the processing portion 120 determines if the actuator arm assembly 108 is in a settle state. If the actuator arm is not in a settle state, the processing portion 120 repeats the operations described with respect to blocks 224 and 228. If at block 228 the processing portion 120 determines that the actuator arm assembly 108 is entering a settle state, it determines wether the long seek flag is set, as noted by block 232. If the long seek flag is set, the processing portion 120 initializes the current runout coefficient with the runout coefficient value stored in the runout coefficient table, as noted by block 236. The processing portion 120 then waits for a servo interrupt in on-track state, as noted by block 240. If at block 232, the long seek flag is not set, the processing portion 120 waits for a servo interrupt in on-track state, as noted by block 240. The processing portion 120 then performs the operations associated with flowchart A which is illustrated in FIG. 8.

With reference now to FIG. 8, the operations of flowchart A are now described. Following a servo interrupt (block 240 of FIG. 7), the processing portion 120 waits for the start of a revolution, as noted by block 244. The processing portion 120 determines if the hard disk 104 is at the start of a revolution at block 248. The start of a revolution is determined using servo information recorded on the disk surface, which includes an index which can be used to determine if the disk is at a start of a revolution. If the processing portion 120 determines at block 248 that the hard disk 104 is not at the start of a revolution, it returns to block 244, and repeats the operations described with respect to blocks 244 and 248. If the processing portion 120 determines that the hard disk 104 is at the start of a revolution, the processing portion 120 integrates the product of the position error signal and the sine of the point in the revolution of the disk 104, as well as integrates the product of the position error signal and the cosine of the point in the revolution of the disk 104, as noted by block 252. At block 256, the processing portion 120 determines if the revolution of the hard disk 104 is complete. If the revolution is not complete, the processing portion 120 repeats the operations described with respect to blocks 252 and 256. If at block 256, the processing portion 120 determines that the revolution of the hard disk 104 is complete, it calculates a runout coefficient and updates the runout coefficient table 128 with the calculated runout coefficient, as noted by block 260. The runout coefficient is calculated using the equations [1] and [2] as described previously.

At block 264, the processing portion 120 determines if the long seek flag is set within the flag storage area 136. If the long seek flag is set, the processing portion 120 determines if the maximum number of revolutions has passed since the actuator arm assembly 108 has been on track, as noted by block 268. If the maximum number of revolutions has passed, the processing portion 120 sets the RRO table update flag in the flag storage area 136, and saves the current runout coefficient to the transient runout coefficient storage area 132, as noted by block 272. The RRO table update flag is an indication for later seek operations that a transient runout coefficient can be updated, and was described above with respect to block 204 of FIG. 7. The processing portion 120 continues track following at block 276. If at block 264 the processing portion 120 determines that the long seek flag is not set, the processing portion 120 continues track following, as noted by block 276. Likewise, if the maximum number of revolutions have not passed since the actuator arm assembly 108 has been on track, the processing portion 120 continues track following, as noted by block 276. It is noted that the present invention may be implemented using software modifications in the disk drive only, without the need for additional hardware modifications.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A hard disk drive, comprising:
   a hard disk having at least one hard disk surface;
   a transducer mounted to an actuator arm;
   control electronics operable to control seek operations and track following operations of said transducer, wherein said control electronics are operable to select one of a first compensation scheme and a second compensation scheme for use in controlling the track following operations of said transducer.

2. A hard disk drive, as claimed in claim 1, wherein said one of a first compensation scheme and a second compensation scheme is selected based on a seek length.

3. A hard disk drive, as claimed in claim 2, wherein said first compensation scheme is selected when said seek length is shorter than a predetermined value.

4. A hard disk drive, as claimed in claim 3, wherein said predetermined value is one-third of a maximum seek length.

5. A hard disk drive, as claimed in claim 3, wherein said predetermined value is one-quarter of a maximum seek length.

6. A hard disk drive, as claimed in claim 3, wherein a runout coefficient for said first compensation scheme is based on a current runout coefficient.

7. A hard disk drive, as claimed in claim 2, wherein said second compensation scheme is selected when said seek length is greater than a predetermined value.

8. A hard disk drive, as claimed in claim 7, wherein said predetermined value is about one-third of a maximum seek length.

9. A hard disk drive, as claimed in claim 7, wherein said predetermined value is about one-quarter of a maximum seek length.

10. A hard disk drive, as claimed in claim 7, wherein a feedforward value for said second compensation scheme is based on a transient runout coefficient.

11. A hard disk drive, as claimed in claim 1, wherein said control electronics are operable to retrieve a control value from a table when a seek length is greater than a predetermined value.

12. A hard disk drive, as claimed in claim 11, wherein said predetermined value is greater than about one-third of the maximum seek length.

13. A hard disk drive, as claimed in claim 11, wherein said predetermined value is greater than about one-quarter of the maximum seek length.

14. A hard disk drive, as claimed in claim 11, wherein said predetermined value is adaptively changed based on a seek length having an average control value of a predetermined amount.

15. A hard disk drive, as claimed in claim 1, wherein said second compensation scheme uses a feedforward value stored during a previous seek operation.

16. A hard disk drive, as claimed in claim 15, wherein said feedforward value is based on a feedforward value from the first revolution of said hard disk during said previous seek operation.

17. A hard disk drive, as claimed in claim 15, wherein said feedforward value is based on a feedforward value from the first two revolutions of said hard disk during said previous seek operation.

18. A hard disk drive, as claimed in claim 15, wherein said feedforward value is based on a feedforward value from the first three revolutions of said hard disk during said previous seek operation.

19. A hard disk drive, as claimed in claim 1, wherein said control electronics include a processing portion and a memory portion.

20. A hard disk drive, as claimed in claim 19, wherein said processing portion is operable to select one of a first and second feedforward value from said memory portion based on a seek length.

21. A hard disk drive, as claimed in claim 20, wherein said processing portion is operable to store said first feedforward value in said memory portion continuously during a track following operation, and wherein said processing portion is operable to store said second feedforward value in said memory portion following a predetermined number of revolutions of said hard disk.

22. A hard disk drive, as claimed in claim 21, wherein said predetermined number of revolutions is one.

23. A hard disk drive, as claimed in claim 21, wherein said predetermined number of revolutions is two.

24. A hard disk drive, as claimed in claim 21, wherein said predetermined number of revolutions is three.

25. A method for compensating for runout in a hard disk drive, comprising:
   determining a seek length of a current seek;
   initializing a current runout coefficient when said seek length is not greater than a predetermined seek length and initializing a transient runout coefficient when said seek length is greater than said predetermined seek length;
   compensating firstly a position of a transducer based on said initializing step;
   calculating an updated runout coefficient; and
   compensating secondly a position of said transducer based on said updated runout coefficient.

26. A method, as claimed in claim 25, further comprising:
   setting a table update indicator and saving said current runout coefficient as a transient runout coefficient when said seek length is greater than said predetermined length.

27. A method, as claimed in claim 25, wherein said predetermined length is about one-third of a maximum seek length.

28. A method, as claimed in claim 25, wherein said predetermined length is about one-quarter of a maximum seek length.

29. A method, as claimed in claim 25, wherein said predetermined length is based upon an average value of said transient runout coefficient.

30. A method, as claimed in claim 25, wherein said setting step is performed after a predetermined number of revolutions of a hard disk.

31. A method, as claimed in claim 30, wherein said predetermined number of revolutions is one.

32. A method, as claimed in claim 30, wherein said predetermined number of revolutions is two.

33. A method, as claimed in claim 30, wherein said predetermined number of revolutions is three.

34. A method for performing a seek in a hard disk drive, comprising:
   updating a runout coefficient table with a transient runout coefficient when a runout table update flag is set;
   initializing a current runout coefficient with said transient runout coefficient when a seek length is greater than a predetermined seek length;
   adjusting firstly a position of an actuator arm based on said initializing step;
   integrating at least one position error signal for a revolution of a hard disk;
   calculating a runout coefficient based on said integrating step; and
   adjusting secondly a position of said actuator arm based on said calculating step.

35. A method, as claimed in claim 34, further comprising:
   setting a table update flag and saving said runout coefficient to said transient runout coefficient after a predetermined number of revolutions of said hard disk when said seek length is greater than said predetermined seek length.

36. A method, as claimed in claim 34, wherein said predetermined length is about one-third of a maximum seek length.

37. A method, as claimed in claim 34, wherein said predetermined length is about one-quarter of a maximum seek length.

38. A method, as claimed in claim 34, wherein said predetermined length is adaptively calculated based on a gain variation over a number of revolutions of a hard disk.

39. A method, as claimed in claim 34, wherein said predetermined number of revolutions is one.

40. A method, as claimed in claim 34, wherein said predetermined number of revolutions is two.

41. A method, as claimed in claim 34, wherein said predetermined number of revolutions is three.

* * * * *